(12) United States Patent
Hsiao et al.

(10) Patent No.: US 9,837,886 B2
(45) Date of Patent: Dec. 5, 2017

(54) POWER CONVERSION SYSTEM FOR PROVIDING A CURRENT TO MEET OPERATION OF AN ELECTRONIC DEVICE BY VARYING A LEAKAGE INDUCTANCE THEREOF AND METHOD FOR PROVIDING THE CURRENT THEREOF

(71) Applicant: Chicony Power Technology Co., Ltd., New Taipei (TW)

(72) Inventors: Yung-Hung Hsiao, New Taipei (TW); Hao-Te Hsu, New Taipei (TW); Chih-Kuan Hu, New Taipei (TW); Cheng-Chang Hsiao, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/073,319

(22) Filed: Mar. 17, 2016

(65) Prior Publication Data

US 2017/0104418 A1    Apr. 13, 2017

(30) Foreign Application Priority Data

Oct. 12, 2015  (TW) .............................. 104133388 A

(51) Int. Cl.
  *H02M 1/08*  (2006.01)
  *H02M 1/00*  (2006.01)
  *H02M 3/335*  (2006.01)

(52) U.S. Cl.
  CPC ......... *H02M 1/08* (2013.01); *H02M 3/33592* (2013.01); *H02M 3/33546* (2013.01); *H02M 3/33576* (2013.01); *H02M 2001/0009* (2013.01); *H02M 2001/009* (2013.01); *Y02B 70/1475* (2013.01)

(58) Field of Classification Search
  CPC ............... H02M 3/33546; H02M 1/08; H02M 2001/0009
  See application file for complete search history.

(56) References Cited

U.S. PATENT DOCUMENTS 5,162,663 A  *  11/1992  Combs ..................... H02J 9/061
                                                              307/29
9,125,259 B1 *  9/2015  Xiong ................ H05B 33/0815
(Continued)

*Primary Examiner* — Jue Zhang
*Assistant Examiner* — Lakaisha Jackson
(74) *Attorney, Agent, or Firm* — Muncy, Geissler, Olds & Lowe PC

(57) ABSTRACT

A power conversion system includes an isolating transformer (30) and an output-controlling device (40). The isolating transformer (30) includes a primary winding (310) and a plurality of secondary windings (320a~320d) coupled with the primary winding (310), and the isolating transformer (30) has a plurality of coupling distances between the secondary windings (320a~320d). The output-controlling device (40) includes a controller (420) and a plurality of output-controlling modules (400a~400d), wherein each one of the secondary windings (320a~320d) is electrically connected to one of the output-controlling device (400a~400d). The controller (420) places at least one output-controlling device (400a~400d) in a conducting state for output a rectified power. An amount of the secondary windings (320a~320d) coupled with the primary winding (310) is modulated for varying a leakage inductance of the power conversion system.

15 Claims, 13 Drawing Sheets

(56) References Cited

U.S. PATENT DOCUMENTS

| | | | |
|---|---|---|---|
| 2007/0025031 A1* | 2/2007 | Kwon | H02M 3/33561 361/38 |
| 2007/0046105 A1* | 3/2007 | Johnson | H02M 3/33561 307/29 |
| 2008/0309162 A1* | 12/2008 | Ma | H02M 3/24 307/31 |
| 2009/0179491 A1* | 7/2009 | Ferguson | H02M 3/3353 307/31 |
| 2011/0260820 A1* | 10/2011 | Liao | H01F 27/325 336/192 |
| 2012/0161514 A1* | 6/2012 | Choi | H02M 3/33561 307/17 |
| 2016/0329889 A1* | 11/2016 | Lee | H03K 17/107 |

\* cited by examiner

POWER CONVERSION SYSTEM FOR PROVIDING A CURRENT TO MEET OPERATION OF AN ELECTRONIC DEVICE BY VARYING A LEAKAGE INDUCTANCE THEREOF AND METHOD FOR PROVIDING THE CURRENT THEREOF

BACKGROUND OF THE INVENTION

Field of the Invention

The present disclosure relates to a power conversion system. More particularly, the present disclosure relates to a power conversion system for providing power to meet operations of an electronic device.

Description of Related Art

Since diode and Schottky diode have designated forward bias, the power loss of the power conversion system having the diode or Schottky diode to rectify power is large. Metal-oxide-semiconductor field-effect transistor (MOSFET) has advantages of low input resistance, short response time, and high input resistance, thus it replaces the diode and Schottky diode to be the main component of the rectifier.

In general, the power conversion system includes a plurality of synchronous rectifiers, which are driven at the same time the rectify power entering thereto. Specifically, when an electronic device electrically connected to the power conversion system is activated, the synchronous rectifiers perform synchronous rectifying procedure, and the MOSFETs of the synchronous rectifiers are switched to rectify the power entering the synchronous rectifiers; however, when the electronic device is inactivated, the synchronous rectifiers does not perform synchronous rectifying procedure. Even if the operation manner of the synchronous rectifier mentioned above is easy, the power provides by the power conversion system is a constant no matter the electronic device during non-light load condition and light load condition, thus the power loss during the electronic device under light load condition is large.

SUMMARY OF THE INVENTION

According to one aspect of the present disclosure, a power conversion system used for providing a power required for an electronic device is provided. The power conversion system includes an isolating transformer and an output-controlling device. The isolating transformer includes a primary winding and a plurality of secondary windings coupled with the primary winding, the isolating transformer has a plurality of coupling distances between the secondary windings. The output-controlling device includes a controller and a plurality of output-controlling modules electrically connected to the controller, wherein each of the secondary windings is electrically connected to one of the output-controlling devices. The controller places at least one output-controlling device in a conducting state for outputting a power. An amount of the secondary windings coupled with the primary winding is modulated for varying a leakage inductance of the power conversion system According to another aspect of the present disclosure, a method for powering an electronic device includes the following steps: providing the power conversion system comprising a primary winding and a plurality of secondary windings, and there are a plurality of coupling distances between the primary winding and the secondary windings; sensing a current required for the electronic device; and modulating an amount of the secondary windings coupled with the primary winding for varying a leakage inductance of the power conversion system, thus an output current provided by the power conversion system is modulated to meet the current requirement of the electronic device.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
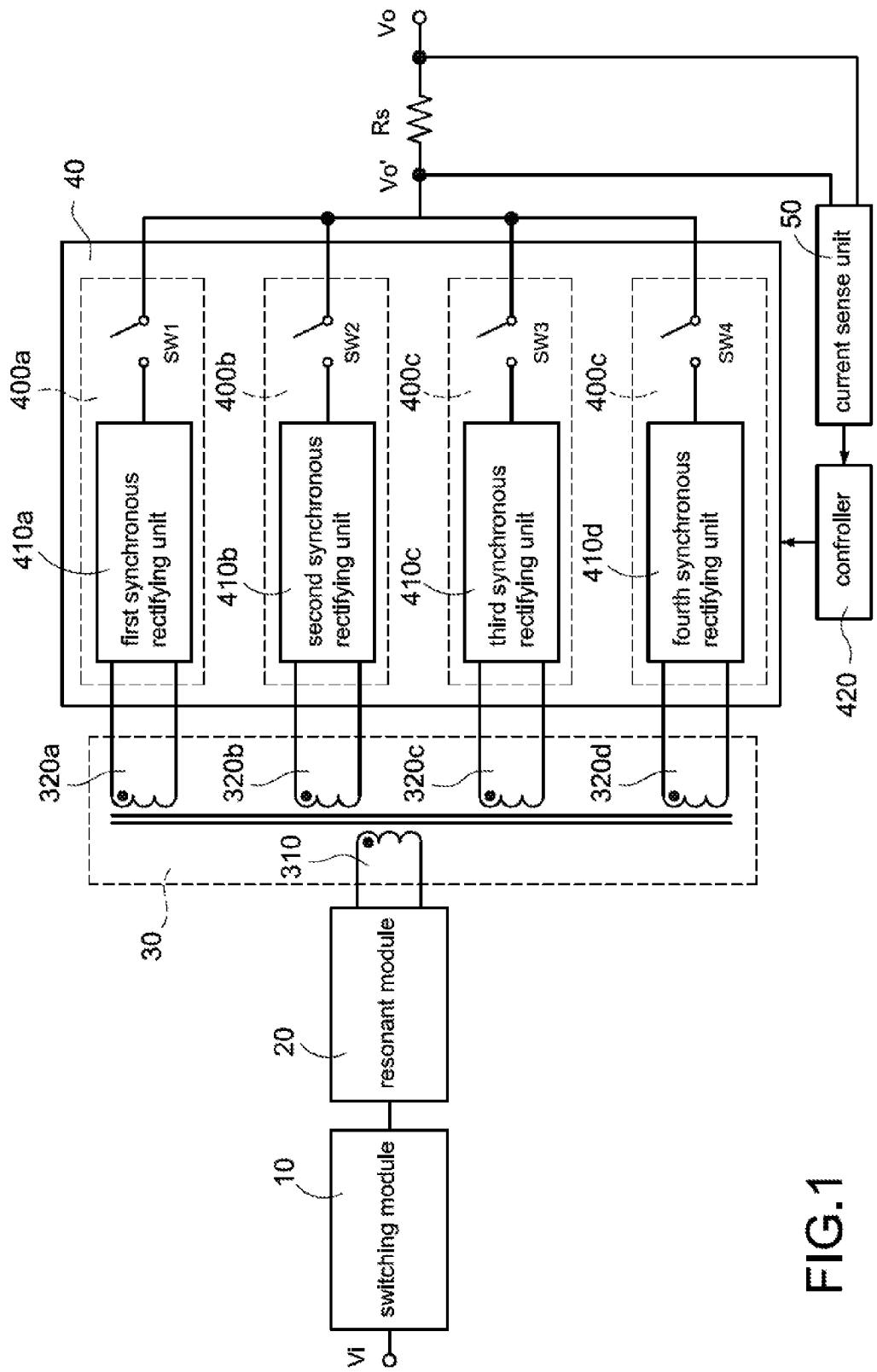
FIG. 1 is a circuit block diagram of a power conversion system according to a first embodiment of the present disclosure.

Reference is made to FIG. 1, which is a circuit block diagram of a power conversion system according to a first embodiment of the present disclosure. In FIG. 1, the power conversion system (its reference numeral is omitted) receives an input voltage Vi and is configured to provide an output voltages Vo. The power conversion system includes a primary side and a secondary side, which are separated by an isolating transformer 30. The isolating transformer 30 includes a primary winding 310 and a plurality of secondary windings 320a~320d magnetically coupled to the primary winding 310. The power conversion system further includes a switching module 10, a resonant module 20, an output-controlling device 40, and a current sense unit 50. The switching module 10, the resonant module 20, and the primary winding 310 are arranged at the primary side of the power conversion system, and the secondary windings 320a~320d, the output-controlling device 40, and the current sense unit 50 are arranged at the secondary side of the power conversion system. The output-controlling device 40 includes a plurality of output-controlling modules 400a~400d, and the controlling modules 400a~400d include a plurality of synchronous rectifying units (details are described in the following paragraphs) and a plurality of output switches (details are described in the following paragraphs). The current sense unit 50 senses a current flowing through a sensing resistor Rs electrically connected to the output-controlling device 40 and sends a current sensed signal to the controller 420 for controlling the operation of the output-controlling device 40.

Figure 2:
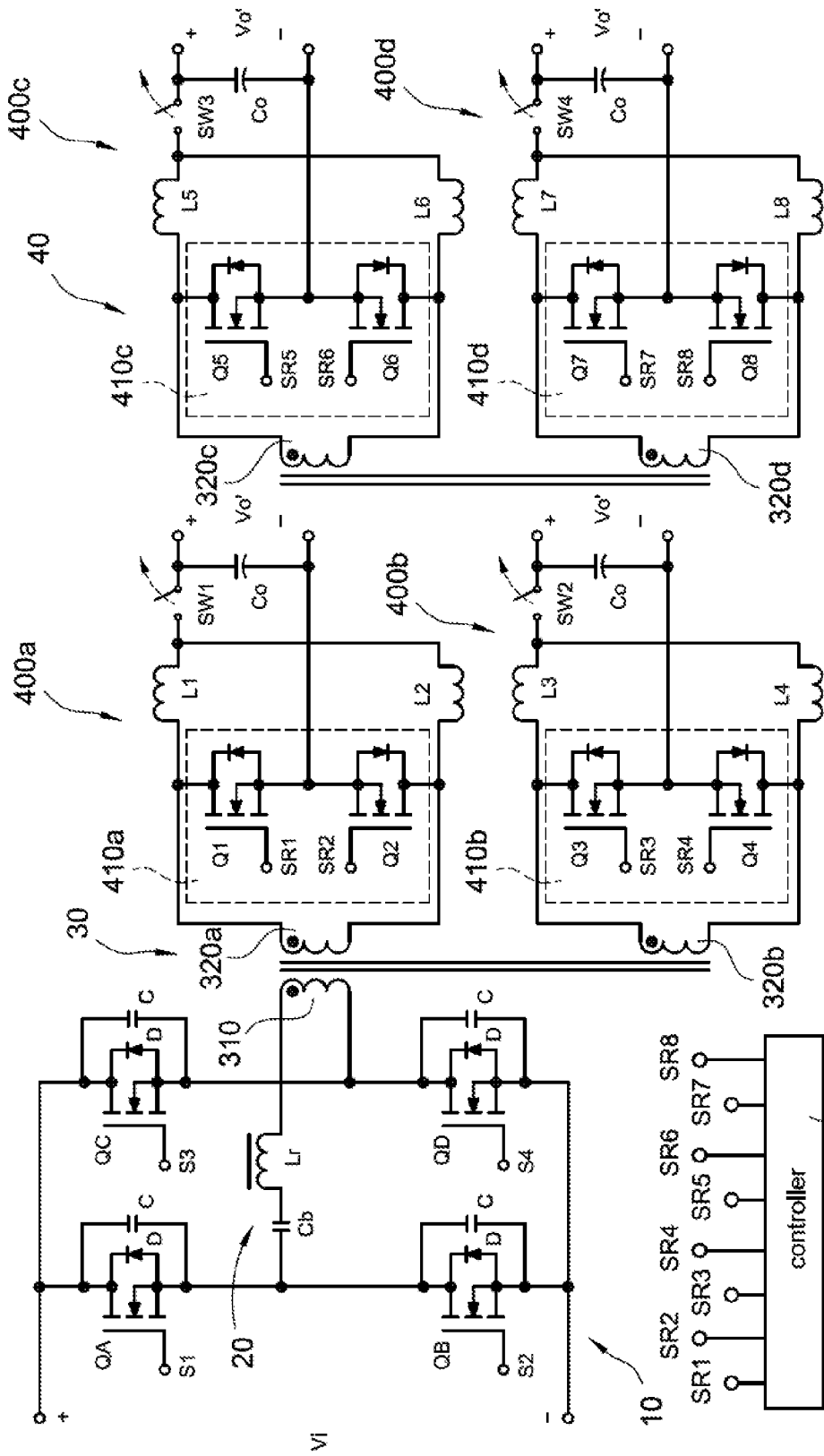
FIG. 2 is a circuit diagram of the power conversion system according to the first embodiment of the present disclosure.

Reference is made to FIG. 2, which is a circuit diagram of a power conversion system according to the first embodiment of the present disclosure. The switching module 10 is electrically connected to the input voltage Vi and includes a first power switch QA, a second power switch QB, a third power switch QC, and a fourth power switch QD. The first to fourth switches QA~QD are, for example, metal-oxide-semiconductor field-effect transistors (MOSFETs). The drains of the first power switch QA and the third power switch QC are connected to the input voltage Vi, the source of the first power switch QA is connected to the drain of the second power switch QB, and the source of the third power switch QC is connected to the drain of the fourth power switch QD and the primary winding 310. The sources of the second power switch QB and the fourth power switch QD are connected to the input voltage Vi.

The switching module 10 may further includes a plurality of diodes D and a plurality of capacitors C electrically connected to the first to fourth power switches QA~QD. Specifically, the diodes D are, for example, the body diodes of the first to fourth power switches QA~QD, and the capacitors C are, for example, parasitic capacitances of the first to fourth power switches QA~QD; the cathode of each diode D is connected to the drain of one of the first to fourth power switches QA~QD, the anode thereof is connected to the source of one of the first to fourth power switches QA~QD, and each of the capacitors C is electrically connected to one of the diodes D in parallel.

The resonant module 20 includes a resonant inductor Lr, a direct-current (DC) isolating capacitor Cb, and a magnetizing inductor. In FIG. 2, the resonant inductor Lr and the isolating transformer 30 are shown integrally; nevertheless, they are able to be separated in the practical manufacturing process. The DC isolating capacitor Cb, the resonant inductor Lr, and the primary winding 310 are electrically connected in series. specifically, one terminal of the DC isolating capacitor Cb is connected to the sources of the first power switch QA and second power switch QB, and the other terminal of the DC isolating capacitor Cb is connected to one terminal of the resonant inductor Lr, and the other terminal of the resonant indictor Lr is connected to the primary winding 310.

The first to fourth power switches QA~QD of the resonant module 20 are controlled using a zero-voltage-switching (ZVS) scheme to reduce switching loss.

The output-controlling device 40 includes a first synchronous rectifying unit 410a, a second synchronous rectifying unit 410b, a third synchronous rectifying unit 410c, a fourth synchronous rectifying unit 410d, a first output switch SW1, a second output switch SW2, a third output switch SW3, and a fourth power switch SW4. The first synchronous rectifying unit 410a is connected to the secondary winding 320a and the first output switch SW1, the second synchronous rectifying unit 410b is electrically connected to the secondary winding 320b and the second output switch SW2, the third synchronous rectifying unit 410c is electrically connected to the secondary winding 320c and the third output switch SW3, and the fourth synchronous rectifying unit 410d is electrically connected to the secondary winding 320d and the fourth output switch SW4.

The first synchronous rectifying unit 410a includes rectifying switches Q1 and Q2, the second synchronous rectifying unit 410b includes rectifying switches Q3 and Q4, the third synchronous rectifying unit 410c includes rectifying switches Q5 and Q6, and the fourth synchronous rectifying unit 410d includes rectifying switches Q7 and Q8. The rectifying switches Q1 to Q8 are, for example, MOSFETs.

The source of the rectifying switch Q1 is connected to the source of the rectifying switch Q2, and the drains of the rectifying switches Q1 and Q2 are respectively connected to the secondary winding 320a (the drain of the rectifying switch Q1 is connected to one terminal of the secondary winding 320a, and the drain of the rectifying switch Q2 is connected to the other terminal of the secondary winding 320a). The source of the rectifying switch Q3 is connected to the source of the rectifying switch Q4, and the drains of the rectifying switches Q3 and Q4 are respectively connected to the secondary winding 320b. The source of the rectifying switch Q5 is connected to the source of the rectifying switch Q6, and the drains of the rectifying switches Q5 and Q6 are respectively connected to the secondary winding 320c. The source of the rectifying switch Q7 is connected to the source of the rectifying switch Q8, and the drains of the rectifying switches Q7 and Q8 are respectively connected to the secondary winding 320d. The gates SR1~SR8 of the rectifying switches Q1~Q8 are electrically connected to the controller 420, and the rectifying switches Q1~Q8 are controlled by the controller 420 using a synchronous rectifying scheme.

The power conversion system further includes filters L1~L8, which are, for example, chokes. The filters L1 and L2 are arranged between the secondary winging 320a and the first output switch SW1, the filter L3 and L4 are arranged between the secondary winding 320b and the second output switch SW2, the filter L5 and L6 are arranged between the secondary winding 320c and the third output switch SW3, and the filter L7 and L8 are arranged between the secondary winding 320d and the fourth output switch SW4. Specifically, each secondary winding 320a~320d has two terminals, one terminal of the secondary winding 320a is connected to the filter L1, and the other terminal thereof is connected to the filter L2; one terminal of the secondary winding 320b is connected to the filter L3, and the other terminal thereof is connected to the filter L4; one terminal of the secondary winding 320c is connected to the filter L5, and the other terminal thereof is connected to the filter L6; one terminal of the secondary winding 320d is connected to the filter L7, and the other terminal thereof is connected to the filter L8.

The power conversion system still further includes a plurality of output capacitors Co. One terminal of the output capacitor is connected to synchronous rectifying unit 410a~410d, and the other terminal thereof is connected to one of the first to fourth output switch SW1~SW4.

It should be noted that the power conversion system is configured to provide different powers to meet the power required for the electronic device. Therefore, the controller 420 may measure the power required for the electronic device by the current sensed signal representing the current flowing through the sensing resistor Rs sent from the current sense unit 50 and place at least one of the synchronous rectifying units 410a~410d or at least one of the first to fourth output switch SW1~SW4 in a conducting state to conduct the power required for the electronic device to the electronic device. It should be noted that when the synchronous rectifying 410a~410d are in the conducting state, the powers coupled to the secondary winding 320a~320d are conducted to the synchronous rectifying units 410a~410d, and a synchronous rectifying procedure is performed. On the contrary, when the synchronous rectifying units 410a~410d are not in the conducting state (or called the synchronous rectifying units 410a~410d are in a non-conducting state), the power transmitted to the primary winding 310 cannot conducted to the secondary windings 320a~320d, and the synchronous rectifying procedure is not performed. Besides, when the first to fourth output switches SW1~SW4 are in the conducting state, the first to fourth output switches SW1~SW4 turn on (close), the powers with synchronous rectification are conducted to the output capacitors Co and the output Vo. One the contrary, when the first to fourth output switches SW1~SW4 are in the non-conducting state, the first to fourth output switches SW1~SW4 turn off (open), the powers with synchronous rectification cannot be conducted to the output capacitors Co and the output Vo.

The isolating transformer 30 and the resonant inductor Lr (if exist) provide a leakage inductance. In order to achieve higher efficiencies and lower electromagnetic interferences (EMI), a zero voltage switching (ZVS) mode is operated. With ZVS mode, during operation, the first to fourth power switches QA~QD in a switching stage of the power conversion system are activated at zero crossings of their main terminal voltage to minimize turn on losses. An amount of time is required by the first to fourth power switches QA~QD to turn off (open) and on (close). The overlap between these transitions can be referred to as dead-time (as time points between t2 and t3 and the time points between t4 and t5 shown in the FIG. 4a). A minimum amount of dead-time is needed to avoid having the first power switch QA and second power switch QB (or the third power switch QC and the fourth power switch QD) closed (turned on) at the same time. If the first power switch QA and the second power switch QB (or the third power switch QC and the fourth power switch QD) are closed at the same time, potentially destructive shoot-through current that travels directly from input voltage Vi to electronic device may result. The period of the dead-time is rises gradually as leakage inductance is increased. The gates of the first to fourth power switches QA~QD are electrically connected to a controlling circuit (not shown), and the first to fourth power switches QA~QD are turned off and on according to signals sent from the controlling circuit.

Figure 4A:
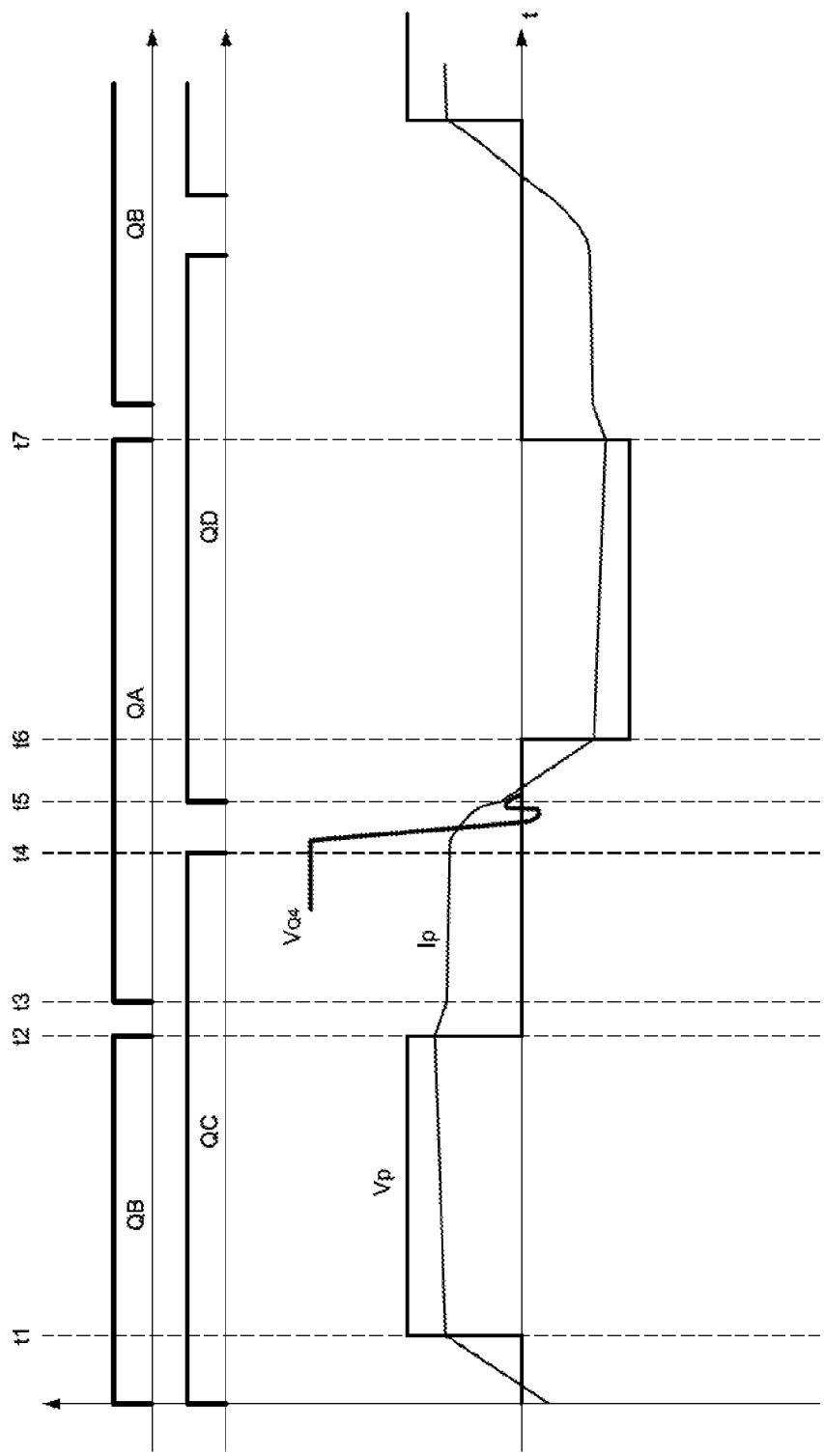
FIGS. 4a and 4b are timing charts indicating operations of the power conversion system during light load condition.

Reference is made to FIG. 2 and FIG. 4a, wherein FIG. 4a is a timing chart indicating operations of the power conversion system during light load condition. In order to clarify detailed operation of the power conversion system of the present disclosure, the following example is given. It should be noted that the values given in the example are only for clarity. The values can be changed to meet system requirements. During the heavy load condition, the power (including voltage and current) provided by the power conversion system is the largest. As the load lightens, the power is reduced. During the light load condition, the power provided by the power conversion system reduces to, for example, 20%; during the normal load condition, the power provided by the power conversion system reduces to, for example, 50%.

Seven time points t1-t7 are shown in the FIG. 4a. With the second power switch QB and the third power switch QC are closed (placed in conducting states) (wherein the first power switch QA and the fourth power switch QD are opened) to provide a conduction path between time points t1 and t2, a primary current Ip from the input voltage Vi flows through the third power switch QC, the primary winding 310, the resonant module 20, the second power switch QB to the ground. During this time, energy is stored in the resonant inductor Lr, and the primary current (Ip) is raised.

The second power switch QB is then opened at time point t2 (the third power switch QC is continuously closed), and then a short time duration later, the first power switch QA is closed (at time point t3). During this short duration, the current supported by the energy stored in the isolating transformer's leakage inductance, and optionally in resonant inductor Lr, now flows out of the capacitances C associated with the first power switch QA and the second power switch QB and into the third power switch QC (which is still closed). Specifically, when the second power switch QB is opened, the primary current Ip freewheels through the diode D associate with the first power switch QA, and the capacitor C associated with the second power switch QB is charged, and the capacitor C associated with the first power switch QA is discharged until the potential of the capacitor C associates with the second power switch QB is equal to that of the input voltage Vi.

When a voltage across drain-source of the first power switch QA is lower than a voltage across the forward bias of the diode D associated with the first power switch QA, the diode D associate with the first power switch QA turns on (placed in conducting states). As such, the first power switch QA is closed under zero-voltage condition (i.e., zero voltage switching). Due to that the voltage across drain-source of the first power switch QA is lower than the voltage across the diode D associate with the first power switch QA, the conduction loss is low. At this time, the primary voltage Vp of the power conversion system is zero.

Between time points t4 and t5, the third power switch QC is closed and the current freewheels through the diode D associated with the fourth power switch QD. During this short duration, the current supported by the energy stored in the isolating transformer's leakage inductance, and optionally in resonant inductor Lr, now flows out of the capacitances C associated with the third power switch QC and the fourth power switch QD and into the first power switch QA (which is still closed). Specifically, when the third power switch QC is opened, the primary current Ip freewheels through the diode D associate with the fourth power switch QD, and the capacitor C associated with the third power switch QC is charged, and the capacitor C associated with the fourth power switch QD is discharged until the potential of the capacitor C associates with the third power switch QC is equal to that of the input voltage Vi and a voltage across drain-source of the fourth power switch QD is dropped to zero (as curve VQ4 shown).

When a voltage across drain-source of the fourth power switch QD is lower than a voltage across the forward bias of the diode D associated with the fourth power switch QD, the diode D associate with the fourth power switch QD turns on (placed in conducting states). As such, the fourth power switch QD is closed under zero-voltage condition.

Due to the voltage across the resonant inductor Lr is equal to the input voltage Vi, the primary current Ip is linearly decreased between time points t5 and t6. In FIG. 4a, a duty cycle loss appears between time points t5 and t6 since a primary voltage Vp does not drop to negative value at time point t5, which the fourth power switch QD is closed (wherein the fourth power switch QD is closed at time point t6). The more the leakage inductance is, the more duty cycle loss is, and the duty cycle loss is given by $$Lr \times \frac{Ip}{Vin}$$

wherein

Lr is the inductance of the resonant inductor;

Ip is the primary current of the power conversion system; and

Vp is the primary voltage of the power conversion system.

Figure 5A:
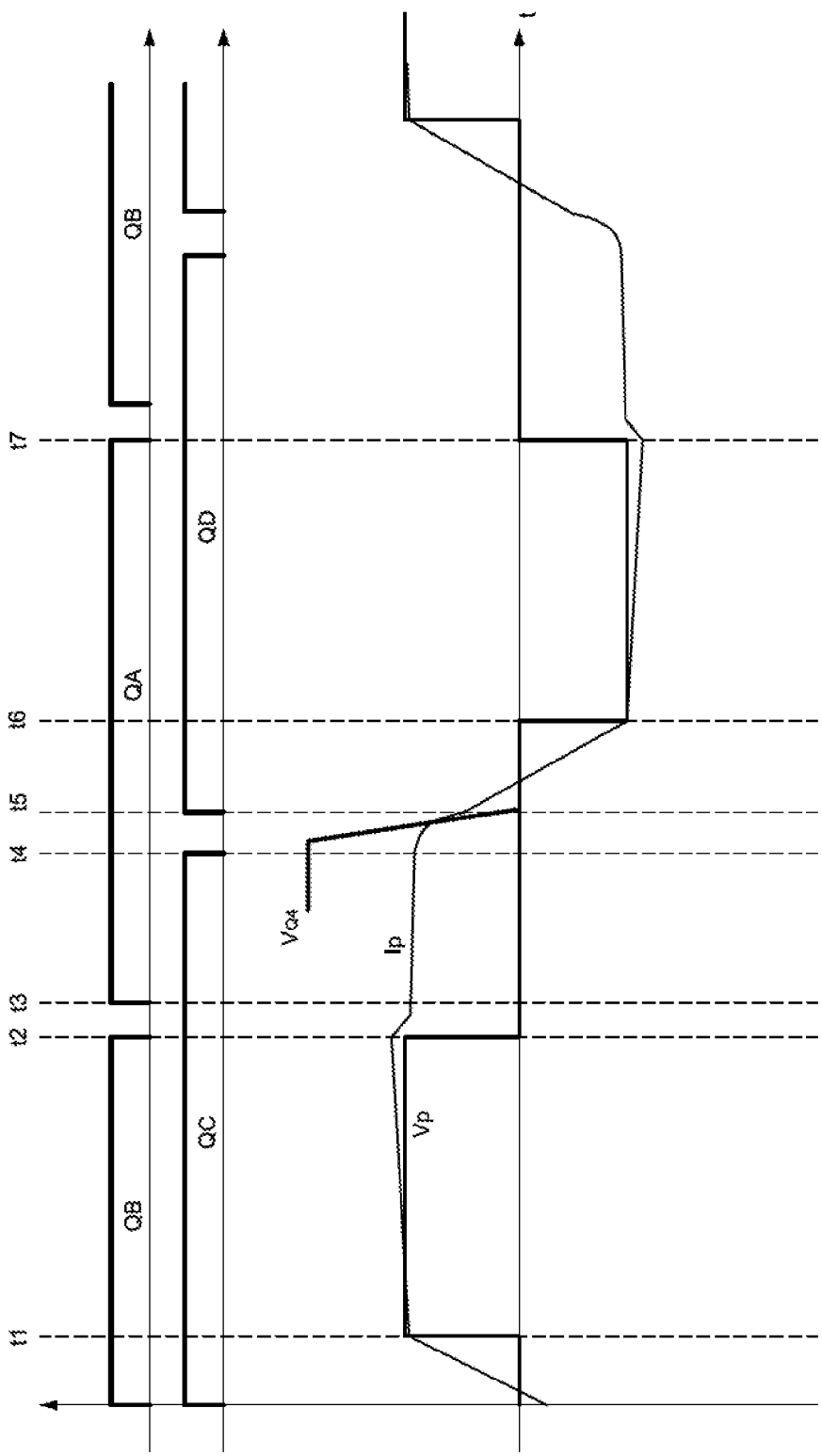
FIGS. 5a and 5b are timing charts indicating operations of the power conversion system during normal load condition.
Figure 6A:
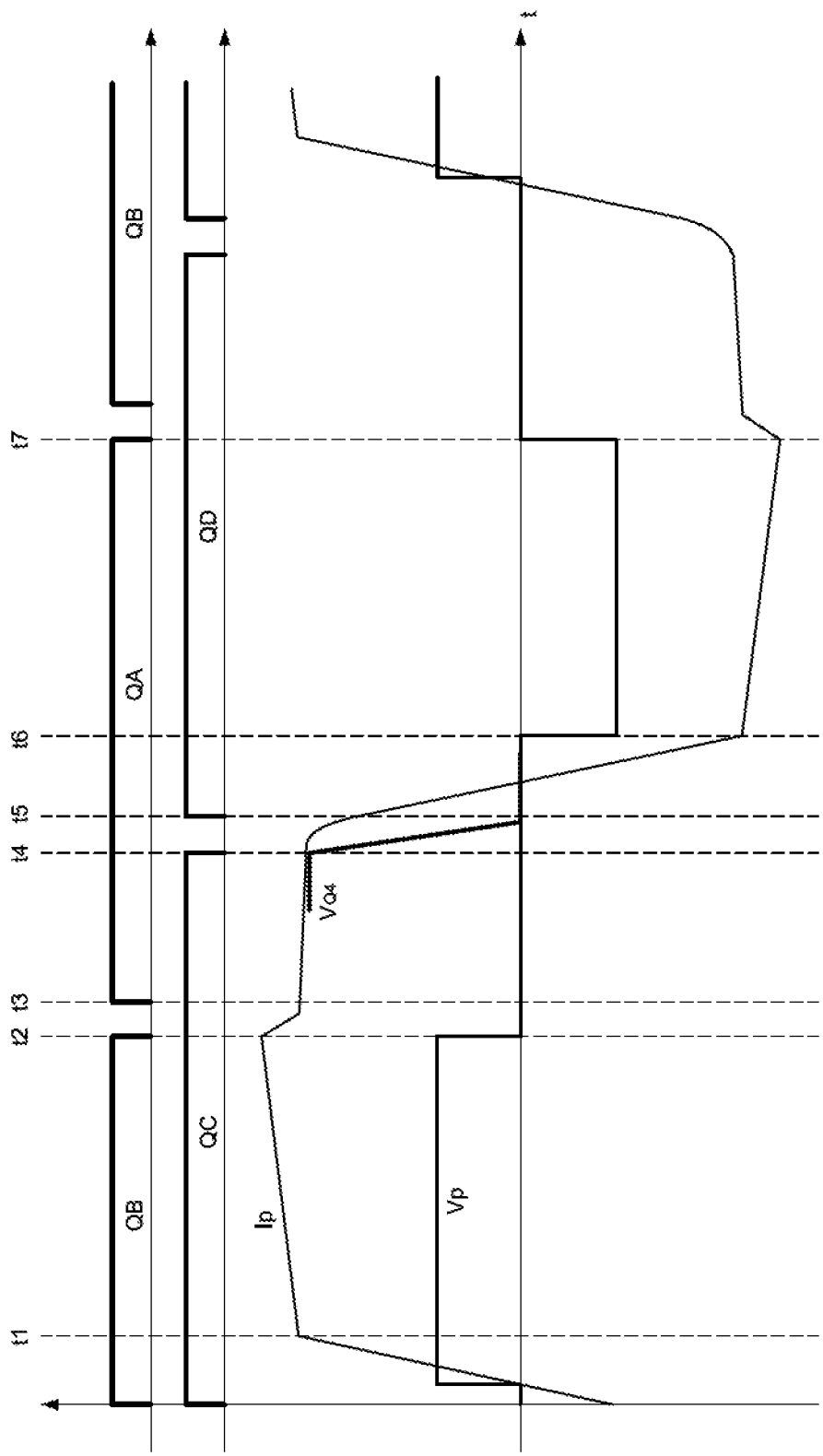
FIGS. 6a and 6b are timing charts indicating operations of the power conversion system during heavy load condition.

FIG. 5a is a timing chart indicating operations of the power conversion system during normal load condition. FIG. 6a is a timing chart indicating operations of the power conversion system during heavy load condition. The function and relative description of the power conversion system during normal load condition and during heavy load condition are the same as that of during light load condition mentioned above and are not repeated here for brevity. It should be noted that the current provided by the power conversion system is increased while the power (current) required for the electronic device is increased, and the duty cycle loss of the power conversion system is increased while the current provided by the power conversion system is increased. As such, a hold-up time depends upon the duty cycle loss is then decreased, that result in lower efficiency. Specifically, if the input voltage Vi falls below the minimum permissible voltage and adversely affects the power conversion system operation, the electronic devices that rely on the power conversion system for power could experience critical failures such as the loss of data. The length of time that the power conversion system can continue to operate in the absence of line voltage is referred to as the hold-up time.

If power conversion system is to provide a better efficiency, then a lower duty cycle loss will be needed. As a result, a distinctive operation of the output-controlling device 40 is required to meet the duty cycle loss required to keep the efficiency of the power conversion system within acceptable limits.

In general, the power provided by the power conversion system depends upon the power required for the electronic device. More particularly, the power required for the electronic device during heavy load condition is higher than that of during the light load condition. Therefore, the power (such as current) provided by the power conversion system while the electronic device operated under heavy load condition will be higher than that of operated under light load condition.

The output-controlling device 40 of the present disclosure is controlled to make the current provided by the power conversion system to meet the power required for the electronic device.

Figure 3:
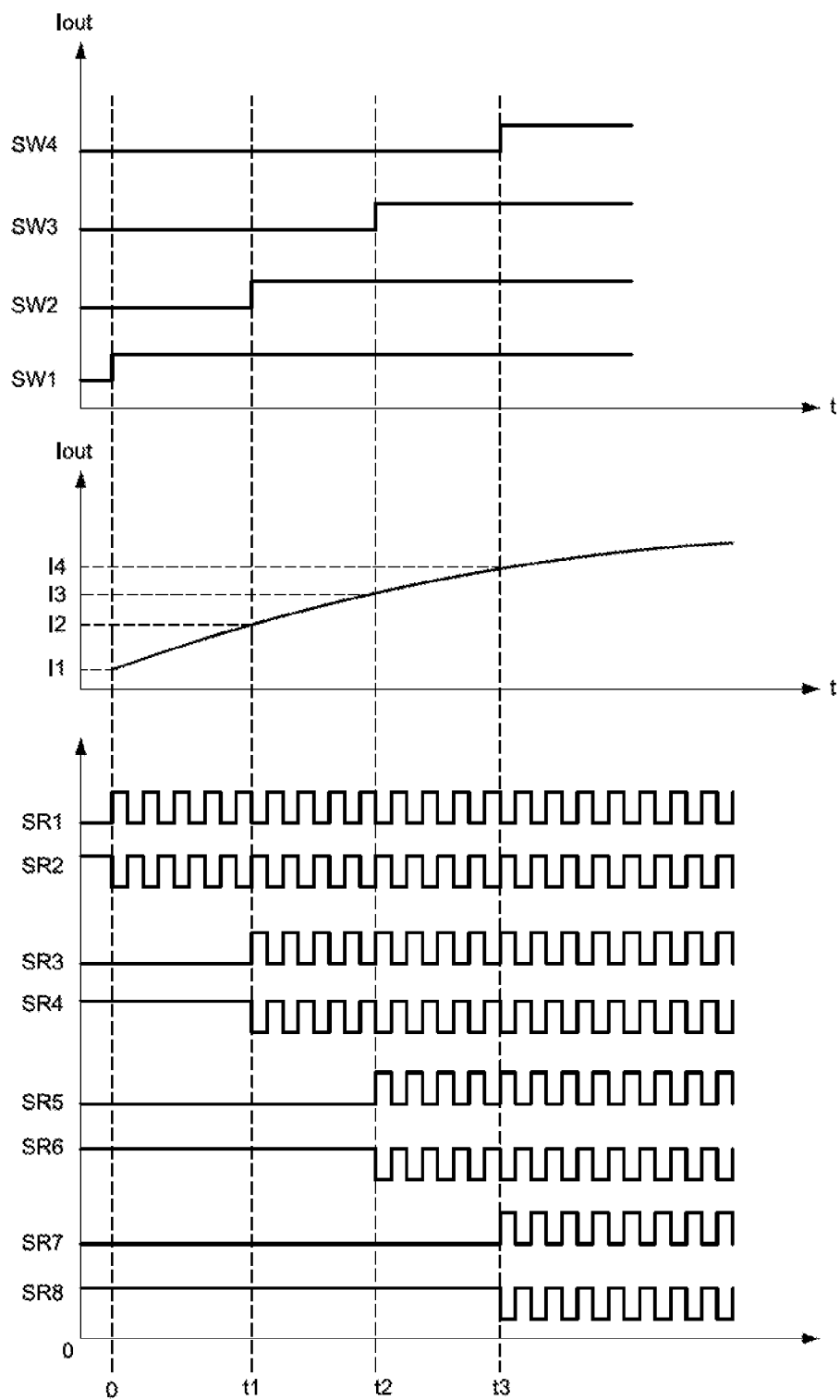
FIG. 3 is a timing chart indicating the operations of power switches and rectifying switches shown in FIG. 2.

The power conversion system may provide the power to meet the required for the electronic device depends upon the operation of the first to fourth synchronous rectifying units 410a~410d of the output-controlling module 400a~400d. Reference is made back to FIG. 2 and FIG. 3. In first operation state, when a first current I1 is required for the electronic device, the controller 420 sends signals to gates SR1~SR8 of the rectifying switches Q1~Q8 according to the current sensed signal sent from the current sense unit 50 for indicating that the first current I1 is required by the electronic device, and places one of the first to fourth rectifying unit 410a~410d in the conducting state for performing synchronous rectifying procedure, thus the first current I1 is provided by the power conversion system. Specifically, the controller 420 may send pulsating signals to drive the rectifying switches Q1 and Q2 to interleaved turn off and on (as time points between 0~t1 shown in FIG. 3), thus a power coupled to the secondary winding 320a is synchronous rectified by the first synchronous rectifying unit 410a and the rectified power is then conducted to the output terminal (connected to the electronic device) by passing through the filters L1 and L2, the first output switch SW1, and the output capacitor Co connected to the first output switch SW1.

In second operation state, when a second current I2 is required for the electronic device, the controller 420 receives the current signal sent from the current sense unit for indicating that the second current I2 is required by the electronic device, and sends signals to the gates SR1~SR8 for placing two of the first to fourth synchronous rectifying units 410a~410d in the conducting state for performing synchronous rectifying procedure, thus the second current I2 is then provided by the power conversion system, the second current I2 is larger than the first current I1. Specifically, the controller 420 may send pulsating signals to drive the rectifying switches Q1~Q4 to interleaved turn off and on (as time points between t1 and t2 shown in FIG. 3), thus powers coupled to the secondary winding 320a and 320b are synchronous rectified by the first and second synchronous rectifying units 410a and the 410b, respectively, and the rectified powers are then conducted to the output terminal (connected to the electronic device) by passing through the filters L1~L4, the first power switch SW1, second output switch SW2, and the output capacitors Co connected to the first power switch SW1 and the second output switch SW2.

In third operation state, when a third current I3 is required for the electronic device, the controller 420 receives the current sensed signal sent from the current sense unit 50 for indicting that the third current is required for the electronic device, and sends signals the gates SR1~SR8 for placing three of the first to fourth synchronous rectifying unit 410a~410d in the conducting state for performing synchronous rectifying procedure, thus the third current I3 is then provided by the power conversion system, the third current I3 is larger than the second current I2. Specifically, the controller 420 may send pulsating signals to drive the rectifying switches Q1~Q6 to interleaved turn off and on (as time points between t2 and t3 shown in FIG. 3), thus powers coupled to the secondary windings 320a~320c are synchronous rectified by the first to third synchronous rectifying units 410a~410c, respectively, and the rectified powers are then conducted to the output terminal (connected to the electronic device) by passing through the filters L1~L6, the first to third output switch SW1~SW3, and the output capacitors Co connected to the first to third output switch SW1~SW3.

In fourth operation state, when a fourth current I4 is required for the electronic device, the controller 420 receives the current sensed signal sent from the current sense unit for indicating that the third current is required for the electronic device, and sends signals to the gates SR1~SR8 for placing all of the first to fourth synchronous rectifying unit 410a~410d in the conducting state for perform synchronous rectifying procedure, thus a fourth current I4 is then provided by the power conversion system, the fourth current I4 is larger than the third current I3. Specifically, the controller 420 may sent pulsating signals to drive the rectifying switches Q1~Q8 to interleaved turn on and off continuously (after time point t3 shown in FIG. 3), thus powers coupled to the secondary winding 320a~320d are synchronous rectified by the first to fourth synchronous rectifying units, respectively, and the rectified power are then conducted to the output terminal (connected to the electronic device) by passing through the filters L1~L8, the first to fourth output switch SW1~SW4 and the output capacitors Co.

As such, an effect of energy conservation is provided and the power loss while the electronic device operated under light load condition is reduced since the first to the fourth rectifying unit 410a~410d are separately placed in the conducting state and driven to synchronous rectify the powers coupled to the secondary windings 320a~320d.

The controller 420 may selectively place the first to fourth switches SW1~SW4 in the conducting state for conducting power required for the electronic device to the output terminal. It should be noted when the controller 420 places at least one of the first to fourth synchronous rectifying units 410a~410d in the conducting state for conducting power require for the electronic device to the output terminal, the first to fourth switches SW1~SW4 are always closed to make the rectified power(s) flowing therethrough; when the controller 420 places at least one of the first to fourth switch SW1~SW4 in the conducting state for conducting power required for the electronic device to the output terminal, the controller 420 sends the pulsating signals to the rectifying switches Q1~Q8 to makes the first to fourth synchronous rectifying units 410a~410d perform synchronous rectifying procedure all the time.

Reference is made back to FIG. 2 and FIG. 3. The controller 420 may place the first switch SW1 in the conducting state for conducting a power coupled to the secondary winding 320a and rectified by the first synchronous rectifying unit 410a to the output terminal (connected to the electronic device) in first operation state, therefore the first current I1 is provided to the electronic device (as the time points between 0 and t1 shown in the FIG. 3).

In second operation state, the controller 420 may place the first switch SW1 and the second switch SW2 in the conducting state for conducting powers coupled to the secondary windings 320a and 320b and rectified by the first synchronous rectifying unit 410a and the second synchronous rectifying unit 410b to the output terminal (connected to the electronic device), therefore the second current I2 is provided to the electronic device (as the time points between t1 and t2 shown in the FIG. 3), wherein the second current I2 is larger than the first current I1.

In third operation state, the controller 420 may place the first to third switches SW1~SW3 in the conducting state for conducting powers coupled to the secondary windings 320a~320c and rectified by the first to third synchronous rectifying units 410a~410c to the output terminal (connected to the electronic device), therefore the third current I3 is provided to the electronic device (as the time points between t2 and t3 shown in the FIG. 3), wherein the third current I3 is larger than the second current I2.

The controller 420 places the first to fourth switches SW1~SW4 in the conducting state for conducting powers coupled to the secondary windings 320a~320d and rectified by the first to fourth synchronous rectifying units 410a~410d to the output terminal (connected to the electronic device), therefore the fourth current I4 is provided to the electronic device (as the time point t3 shown in the FIG. 3), wherein the fourth current I4 is larger than the third current I3.

The arrangement of the primary winding 310 and the second windings 320a~320d of the present disclosure is further controlled to lower the power loss of the power conversion system.

Figure 7:
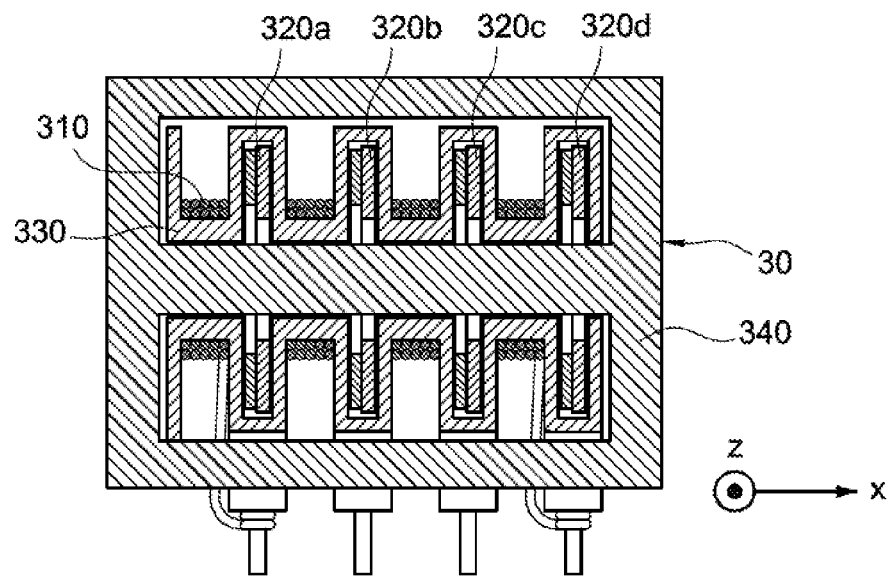
FIG. 7 is a cross sectional view of an isolating transformer according to the first embodiment of the present disclosure.

Reference is made to FIG. 7, which is a cross-sectional view of the isolating transformer according to the first embodiment of the present disclosure. The isolating transformer 30 further includes a bobbin 330 and a magnetic core 340, and the magnetic core 340 is assembled with the bobbin 330. The primary winding 310 and the secondary winding 320a~320d are placed on the bobbin 330. In FIG. 7, the isolating transformer 30 includes one primary winding 310 and four secondary windings 320a~320d, the secondary windings 320a~320d are arranged at the bobbin 330 with equidistance intervals (such as inserted into slots preset on the bobbin 330 with equidistance intervals), the primary winding 310 is wound on the bobbin 330 (where the secondary windings 320a~320d does not placed and across each of the secondary windings 320a~320d). As a result, the primary winding 310 and the secondary windings 320a~320d are arranged in a staggered manner in a side view direction, i.e., the primary winding 310 is placed at same side of each secondary winding 320a~320d (wherein in FIG. 7, the primary winding 310 is wound on the bobbin 310 and placed at the left side of the secondary winding 320a~320d).

Reference is made back to FIG. 2 and FIG. 7, the power conversion system may provide power required for the electronic device by controlling the operation states of the output-controlling modules 400a~400d.

In one of the operation states, the controller 420 may send pulsating signals to drive the rectifying switches Q1~Q8 to perform synchronous rectifying procedure. As a result, the power coupled to the second windings 320a~32d is synchronously rectified by the first to fourth synchronous rectifying units 410a~410d, and the rectified powers are then conducted to the output terminal (connected to the electronic device) by passing through the conducted first to fourth switches SW1~SW4. Selectively, the controller 420 may drive the first to fourth switches SW1~SW4 to close and then conduct the power coupled to the second windings 320a~320d and rectified by the first to fourth synchronous rectifying units 410a~410d to the output terminal (connected to the electronic device). As a result, a leakage inductance based on the magnetic coupling between the primary winding 310, the secondary windings 320a~320d, and optionally in resonant inductor Lr is generated.

Figure 8:
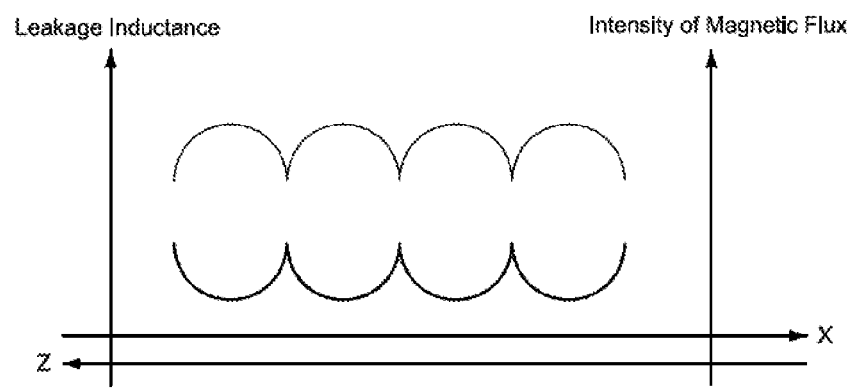
FIG. 8 is a diagram showing the state of leakage inductance, the magnetic flux, and temperature distribution in the isolating transformer shown in the FIG. 7.
Figure 8:
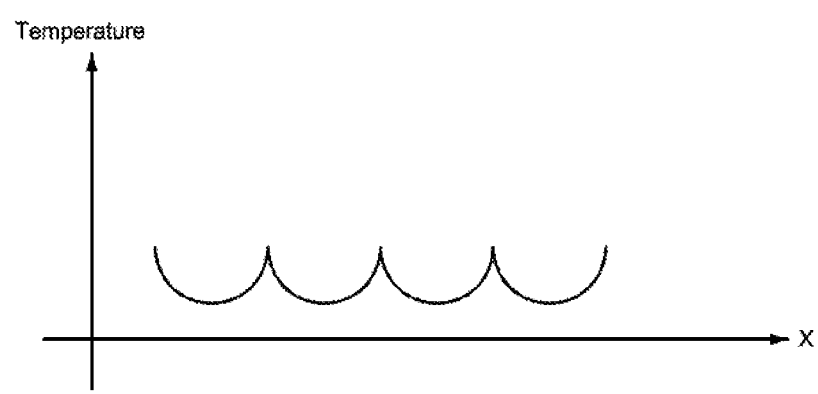

Reference is made to FIG. 8, the lowest leakage inductance appears at the points that each of the second windings 320a~320d is close to the primary winding 310, and the leakage inductance is increased when the coupling distance between each of the secondary windings 320a~320d and the primary winding 310 is increased. The leakage inductance varies in a fixed range since the primary winding 310 and the secondary windings 320a~320d are arranged in the staggered manner.

In another operation state, the controller 420 may send pulsating signals to the rectifying switches Q1~Q2 to drive the first synchronous rectifying unit 410a perform synchronous rectifying procedure (wherein the rectifying switches Q3~Q8 are always opened). As a result, only the power coupled to the second windings 320a is synchronously rectified by the first synchronous rectifying units 410a, and the rectified power is then conducted to the output terminal (connected to the electronic device) by passing through the conducted first to fourth switches SW1~SW4. Selectively, the controller 420 may drive the first switch SW1 to close and conduct the power coupled to the second windings 320a and rectified by the first synchronous rectifying units 410a to the output terminal (connected to the electronic device). Another leakage inductance based on the magnetic coupling between the primary winding 310, the secondary windings 320a, and optionally in resonant inductor Lr is generated.

Figure 9:
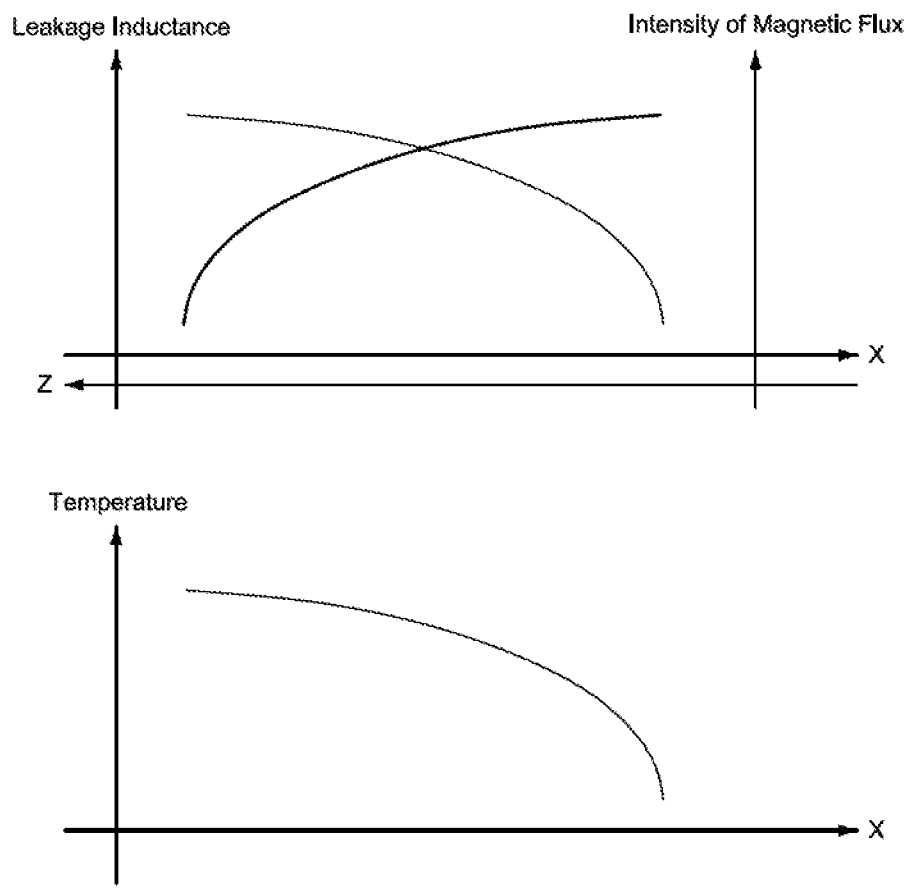
FIG. 9 is a diagram showing the state of leakage inductance, the magnetic flux, and temperature distribution in the isolating transformer shown in the FIG. 7.

Reference is made to FIG. 9, the lowest leakage inductance appears at the point between the second winding 320a and the primary winding 310, and the leakage inductance is increased when the coupling distance between the secondary winding 320a and the primary winding 310 is increased.

In the other state, the controller 420 may send pulsating signals to the rectifying switches Q3~Q6 to drive the second synchronous rectifying unit 410b and the third synchronous rectifying unit 410c to perform synchronous rectifying procedure (wherein the rectifying switches Q1, Q2, Q7, and Q8 are always opened). As a result, only the powers coupled to the second windings 320b and 320c are synchronously rectified by the second synchronous rectifying units 410b and the third synchronous rectifying units 410c, and the rectified powers are then conducted to the output terminal (connected to the electronic device) by passing through the conducted first to fourth switches SW1~SW4. Selectively, the controller 420 may drive the second switch SW2 and the third switch SW3 to close and conduct the powers coupled to the second windings 320b and 320c and rectified by the second synchronous rectifying unit 410b and the third synchronous rectifying units 410c to the output terminal (electrically connected to the electronic device). Still another leakage inductance based on the magnetic coupling between the primary winding 310, the secondary windings 320b and 320c, and optionally in resonant inductor Lr is generated.

Figure 10:
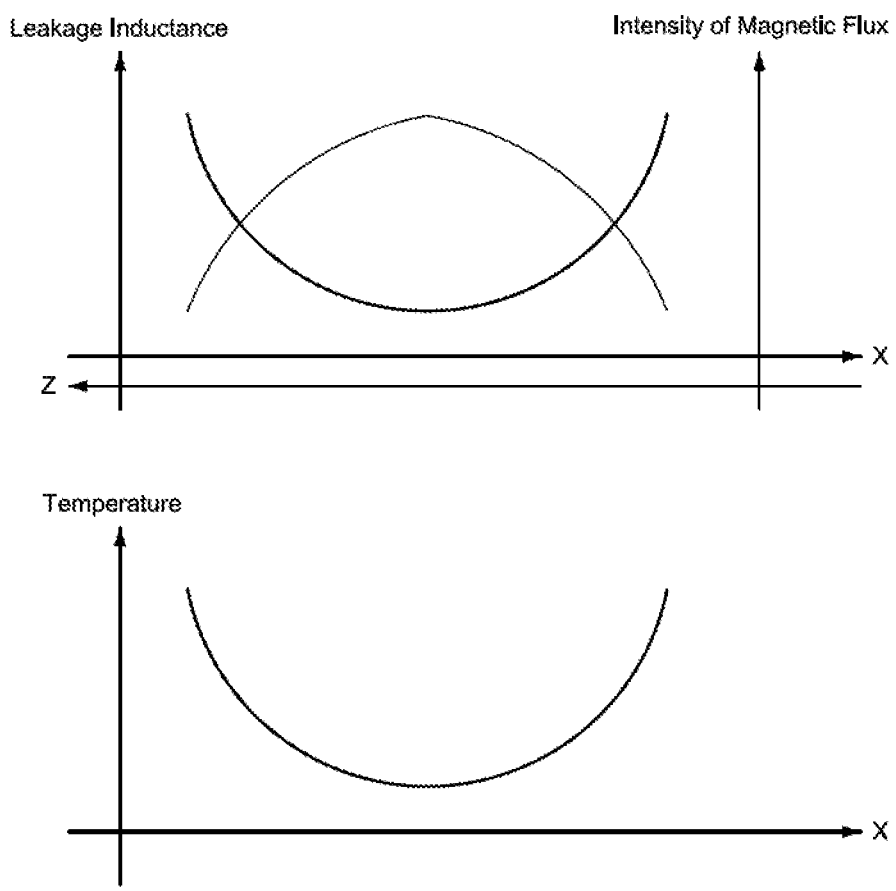
FIG. 10 is a diagram showing the state of leakage inductance, the magnetic flux, and temperature distribution in the isolating transformer shown in the FIG. 7.

Reference is made to FIG. 10, the lowest leakage inductance appears at the point between the second windings 320b, 320c and the primary winding 310, and the leakage inductance is increased when the coupling distance between the secondary winding 320b, 320c and the primary winding 310 is increased.

In sum, the amount of the first to fourth synchronous rectifying units 410a~410d performing synchronous rectifying procedure and the coupling distance between the secondary winding 320a~320d performing synchronous rectifying and the primary windings 310 affects the leakage inductance of the power converting system. As such, by effectively controlling the amount of the first to fourth synchronous rectifying units 410a~410d performing synchronous rectifying procedure and the coupling distance mentioned above, the power conversion system can accurately provide power required for the electronic device to the electronic device.

It should be noted that the power conversion system provides power to the electronic device only when the synchronous rectifying unit (410a~410d) connected to the particular secondary winding (320a~320d) performs synchronous rectifying procedure and the output switch (SW1~SW4) connected to the synchronous rectifying (410a~410d) is close. For example, reference is made to FIG. 2, when the first synchronous rectifying unit 410a performs synchronous rectifying procedure and the first switch SW1 is close, the power conducted to the primary winding 310 is coupled to the secondary winding 320a connected to the first synchronous rectifying unit 410a, and then the rectified power is conducted to the electronic device by passing through the filters L1 and L2. In the meanwhile, a leakage inductance based on the magnetic coupling between the primary winding 310 and the secondary windings 320a~320d is generated.

The detail data of the leakage inductance in different operation states are shown in Table 1.

TABLE 1

| | 1st synchronous rectifying unit | 2nd synchronous rectifying unit | 3rd synchronous rectifying unit | 4th synchronous rectifying unit | Leakage inductance (μH) |
|---|---|---|---|---|---|
| 1st state | non-conducting | non-conducting | non-conducting | conducting state | 25.19 |
| 2nd state | conducting state | non-conducting state | non-conducting state | non-conducting state | 24.4 |
| 3rd state | conducting state | non-conducting state | non-conducting state | conducting state | 14.59 |
| 4th state | non-conducting state | non-conducting state | conducting state | non-conducting state | 12.3 |
| 5th state | non-conducting state | conducting state | non-conducting state | non-conducting state | 12.2 |
| 6th state | non-conducting state | non-conducting state | conducting state | conducting state | 11.93 |
| 7th state | conducting state | conducting state | non-conducting state | non-conducting state | 10.13 |
| 8th state | conducting state | non-conducting state | conducting state | conducting state | 9.95 |
| 9th state | conducting state | non-conducting state | conducting state | non-conducting state | 9.9 |
| 10th state | non-conducting state | conducting state | non-conducting state | conducting state | 9.89 |
| 11th state | conducting state | conducting state | non-conducting state | conducting state | 8.29 |
| 12th state | conducting state | conducting state | conducting state | non-conducting state | 8.2 |
| 13th state | non-conducting state | conducting state | conducting state | conducting state | 8.12 |
| 14th state | conducting state | conducting state | conducting state | conducting state | 8.02 |
| 15th state | non-conducting state | conducting state | conducting state | non-conducting state | 8 |

In Table 1, "conducting state" means that the synchronous rectifying unit (410a~410d) is places in the conducting state and performs synchronous rectifying procedure, thus the power conducted to the primary winding 310 may be coupled to particular secondary winding (320a~320d) connected to the synchronous rectifying unit (410a~410d) placed in the conducting state, and a rectified power is then conducted to the electronic device; nevertheless, "non-conducting state" means that the synchronous rectifying unit 410a~410d is places in the non-conducting state and does not perform synchronous rectifying procedure, and the power conducted to the primary winding 310 does not coupled to the secondary winding 320a~320d connected to the synchronous rectifying unit 410a~410d placed in the non-conducting state.

Figure 4B:
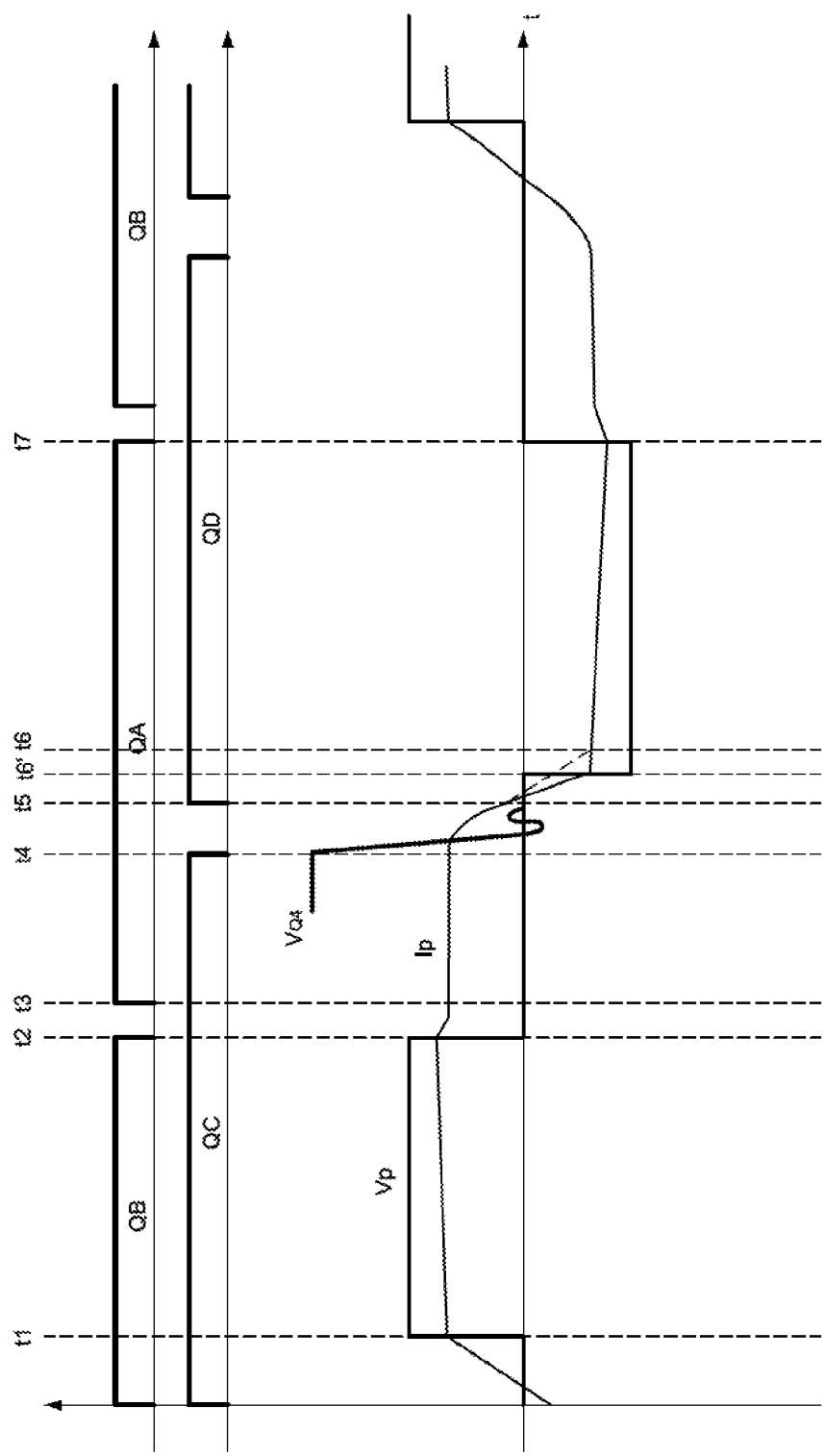

Reference is made to FIG. 4b, which is another timing chart indicating operations of the power conversion system during light load condition. It should be noted that the timing chart shown in the FIG. 4b indicates the power conversion system which the amount of the first to fourth synchronous rectifying units 410a~410d performing synchronous rectifying procedure and the coupling distance between the secondary winding 320a~320d connected to the first to fourth synchronous rectifying units 410a~410d performing synchronous rectifying procedure and the primary windings 310 are controlled as mentioned above. In FIG. 4b, a duty cycle loss appears between time points t5 and t6' since a primary voltage Vp does not drop to negative value at time point t5, which the fourth power switch QD is closed. Comparing to the FIG. 4*a* (the duty cycle loss appears between time points t5 and t6), the duty cycle loss shown in the FIG. 4*b* is reduced (the period between time points t6' and t6 shown in the FIG. 4*b* indicates the duty cycle loss which is eliminated from FIG. 4*a*).

Figure 5B:
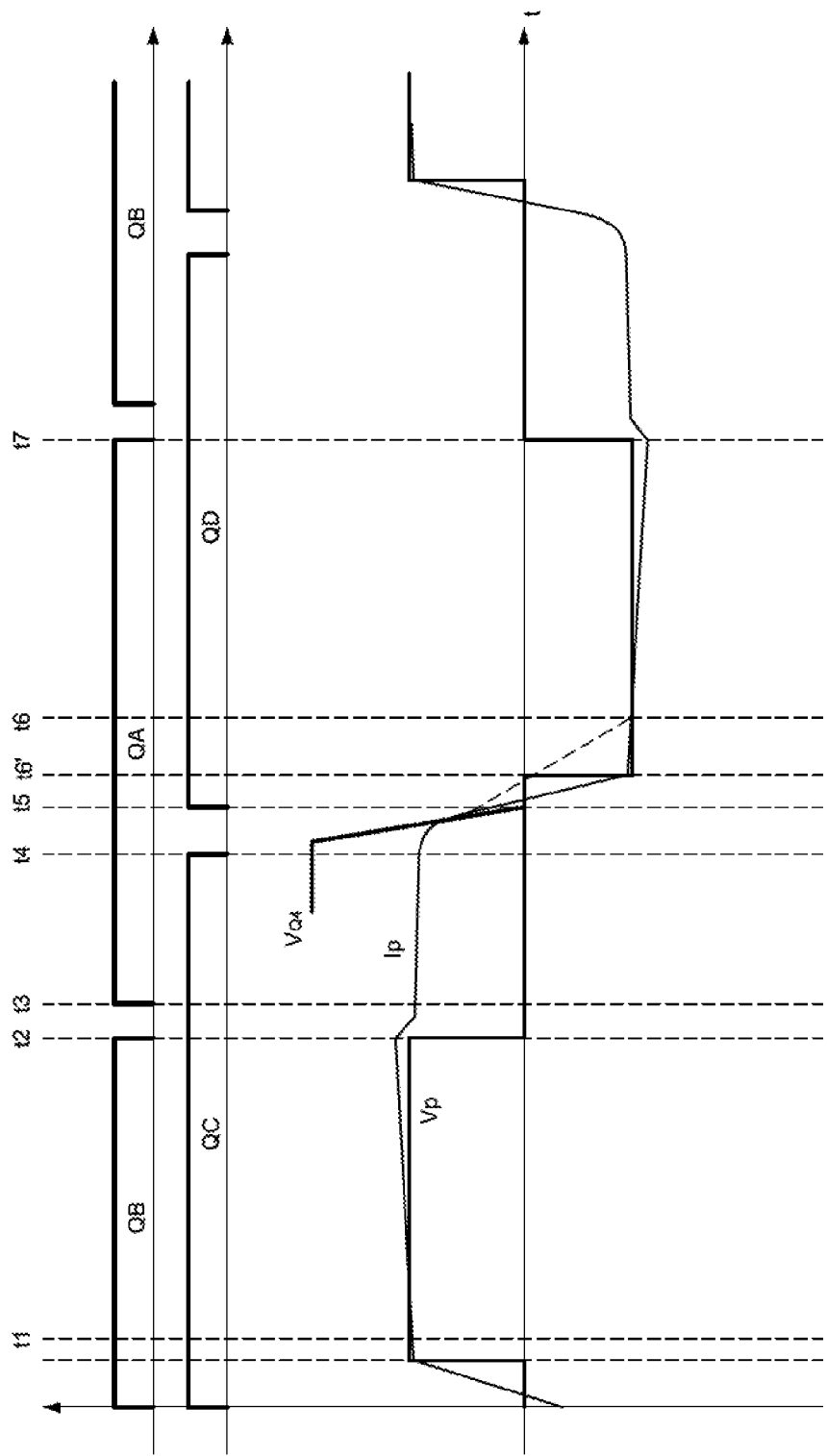
Figure 6B:
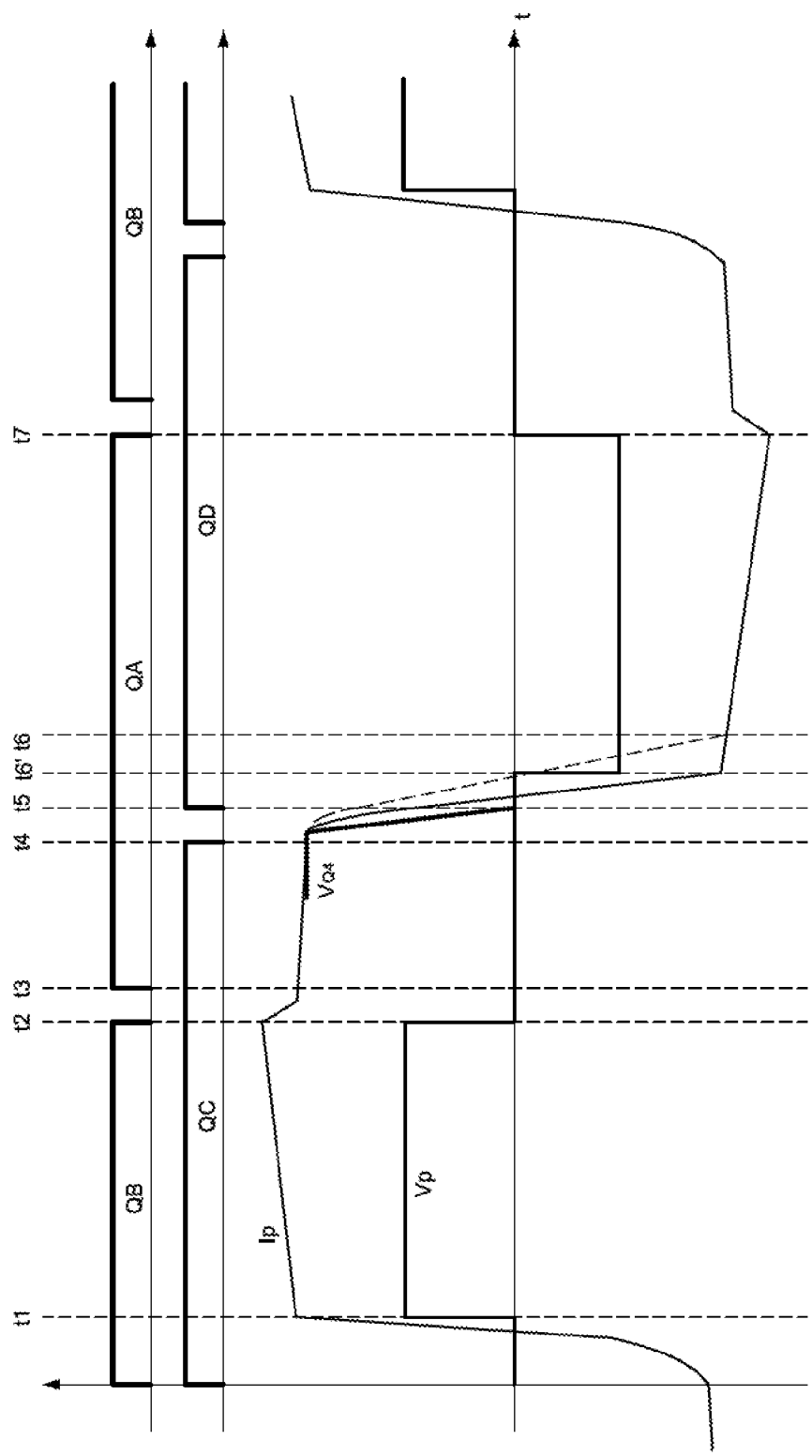

FIG. 5*b* is another timing chart indicating operations of the power conversion system during normal load condition. FIG. 6*b* is another timing chart indicating operations of the power conversion system during heavy load condition. In FIGS. 5*b* and 6*b*, the period between time points t5 and t6 indicates duty time loss of the power conversion system which the amount of the synchronous rectifying units performing synchronous rectifying procedure and the coupling distance between the secondary winding 320*a*~320*d* and the primary windings 310 are not controlled (for example, the first to fourth synchronous rectifying units 410*a*~410*d* perform synchronous rectifying procedure as the same time). On the contrary, the period between time points t5 and t6' indicates duty time loss of the power conversion system which the amount of the synchronous rectifying units performing synchronous rectifying procedure and the coupling distance between the secondary winding 320*a*~320*d* and the primary windings 310 are well controlled (wherein the period between time points t6' and t6 shown in the FIG. 5*b* and FIG. 6*b* indicates the duty cycle loss which is eliminated from FIGS. 5*a* and 6*a*).

In order to prevent generated heat that arises at the time of driving from being stored, the first to fourth synchronous rectifying units 410*a*~410*d* may perform synchronous rectifying procedure in sequence. For example, the controller 420 may progressively increase the amount of the synchronous rectifying units (410*a*~410*d*) performing synchronous rectifying procedure when the power required for the electronic device is gradually increased. In addition, the controller 420 may drives the synchronous rectifying units (410*a*~410*d*) in a convergence manner when only one of the synchronous rectifying units (410*a*~410*d*) performs synchronous rectifying procedure. More particularly, the convergence manner may first make the synchronous rectifying unit (410*a*~410*d*) far from a central axis of the isolating transformer 30 shown in the FIG. 7 perform synchronous rectifying procedure, and next makes the synchronous rectifying units close to the central axis of the transformer shown in the FIG. 7 to prevent generated heat that arises at the time of driving from being stored, i.e., the controller 420 may makes the first synchronous rectifying units 410*a*, the fourth synchronous rectifying units 410*d*, the second synchronous rectifying units 410*b*, and the third synchronous rectifying units 410*c* shown in the FIG. 7 perform synchronous rectifying procedure in sequence. It should be noted that if the distances between two synchronous rectifying units and the central axis are the same, the two synchronous rectifying units interleaved perform synchronous rectifying procedure.

Reference is made back to Table 1, in 1st and 2nd states, they are only one of the synchronous rectifying units is placed in the conducting state and performs synchronous rectifying procedure. As can be shown in FIG. 7, the distance between the synchronous rectifying unit performing synchronous rectifying procedure in 1st state and the central axis of the isolating transformer 30 is equal to that of in 2nd state, and the leakage inductance in 1st state is close to that of in 2nd state. Therefore, the controller 420 may interleaved drive the first synchronous rectifying unit 410*a* and the fourth synchronous rectifying unit 410*d* to conduct the power coupled to the secondary winding 320*a* and 320*d* to the electronic device while the electronic device is operated under the same condition (such as light load condition) to prevent generated heat that arises at the time of driving from being stored in particular synchronous rectifying unit (410*a*~410*d*), which is placed in the conducting state and performs synchronous rectifying procedure all the time.

It should be noted that the synchronous rectifying units (410*a*~410*d*) may be interleaved placed in the conducting state (i.e. the first to fourth synchronous rectifying units 410*a*~410*d* may be driven to interleaved perform synchronous rectifying procedure) according to the distance between the central axis and the synchronous rectifying units (410*a*~410*d*), for example, the synchronous rectifying units (410*a*~410*d*) with same distance from the central axis may be interleaved driven to perform synchronous rectifying procedure. However, that the synchronous rectifying units (410*a*~410*d*) may be driven to interleaved perform synchronous rectifying procedure according to inductance in different operation states of the synchronous rectifying units (410*a*~410*d*). For example, the operation states with similar leakage inductance (such as the difference in leakage inductance between the operation states is less than 5 μH) may be interleaved driven to perform synchronous rectifying procedure.

In sum, the power conversion system of the present disclosure performs a power conversion procedure for powering the electronic device includes step as following first, the power conversion system including a primary winding 310, a plurality of secondary windings 320*a*~320*d*, and a plurality of synchronous rectifying units 410*a*~410*d* is provided. There are a plurality of coupling distances between the primary winding 310 and the secondary windings 320*a*~320*d*.

Next, the operation condition (such as light load condition, normal load condition, or heavy load condition) of the electronic device is measured by measuring a current required by the electronic device. Specifically, the current required for the electronic device during light load condition may be smaller than that of during normal load condition, and the current required for the electronic device during heavy load condition may be larger than that of during normal load condition. Thereafter, the synchronous rectifying units (410*a*~410*d*) are selectively placed in a conducting state for varying a leakage inductance of the power conversion system, thus a output current of the power conversion system is modulated to meet the current requirement of the electronic device. The output current is only provided by the synchronous rectifying units 410*a*~410*d* which is placed in the conducting state, and the power conversion system has a lowest leakage inductance when all of the output-controlling modules 400*a*~400*d* are placed in the conducting state, therefore a largest output current is provided.

The power conversion system may vary the leakage inductance by selectively place one of the synchronous rectifying units 410*a*~410*d* in the conducting state at a time; however, the power conversion system may further selectively place two or more synchronous rectifying units 410*a*~410*d* at a time. Besides, the leakage inductance of the power conversion system is varied when an amount of the synchronous rectifying units 410*a*~410*d* placed in the conducting state changes.

Figure 11:
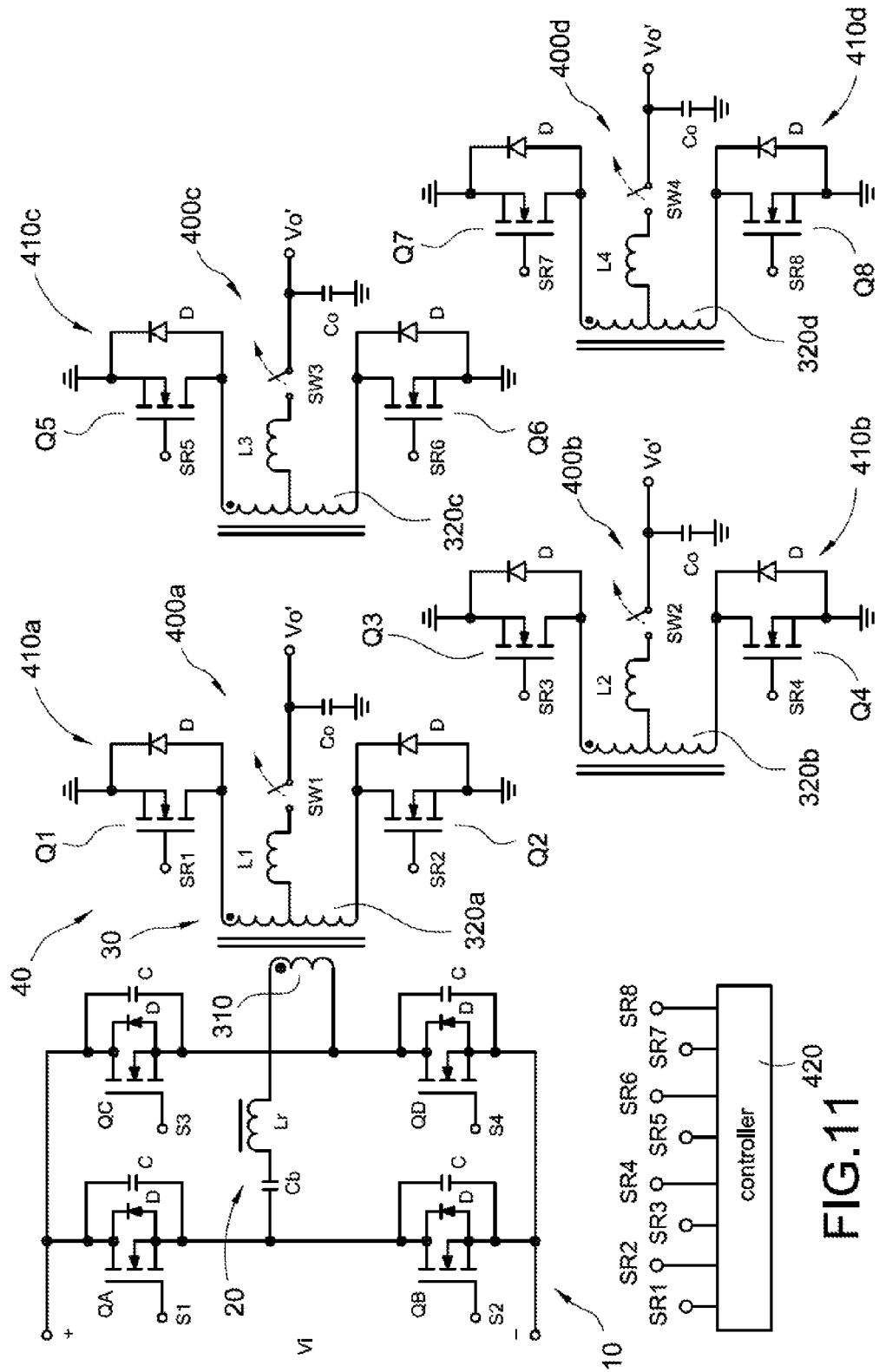
FIG. 11 is a circuit diagram of a power conversion system according to a second embodiment of the present disclosure.

Reference is made to FIG. 11, which is a circuit diagram of a power conversion system according to a second embodiment of the present disclosure. In FIG. 11, the power conversion system includes a switching module 10, a resonant module 20, a transformer 30, and an output-controlling device 40. The transformer 30 includes a primary winding 310 and a plurality of secondary windings 320a~320d coupled with the primary winding 310.

The function and relative description of switching module 10 and the resonant module 20 of the power conversion system shown in the FIG. 11 are the same as that of first embodiment (shown in the FIG. 2) mentioned above and are not repeated here for brevity, and the switching module 10 and the resonant module 20 of the power conversion system shown in the FIG. 11 can achieve the functions as power conversion system of the first embodiment does. It should be noted that the transformer 30 and the output-controlling device 40 shown in the FIG. 11 is different from that of the first embodiment.

In FIG. 11, the transformer 30 is a center-tapped transformer, which has an advantage of compact. However, the isolating transformer shown in FIG. 2 has an advantage of double-current. The output-controlling device 40 is electrically connected to the secondary winding 320a~320d of the transformer and includes first to fourth synchronous rectifying units 410a~410d, controller 420, and first to fourth output switch SW1~SW4. The first synchronous rectifying unit 410a is connected to the secondary winding 320a, the second synchronous rectifying unit 410b is connected to the secondary winding 320b, the third synchronous rectifying unit 410c is connected to the secondary winding 320c, and the fourth synchronous rectifying unit 410d is connected to the secondary winding 320d.

The first synchronous rectifying unit 410a includes rectifying switches Q1 and Q2, the second synchronous rectifying unit 410b includes rectifying switches Q3 and Q4, the third synchronous rectifying unit 410c includes rectifying switches Q5 and Q6, and the fourth synchronous rectifying unit 410d includes rectifying switches Q7 and Q8. Specifically, the sources of the rectifying switch Q1 and Q2 are connected to ground, the drains thereof is connected to two taps of the second winding 320a, and the filter L1 is connected to the center-tap of the second winding 320a; the sources of the rectifying switch Q3 and Q4 are connected to ground, the drains thereof is connected to two taps of the second winding 320b, and the filter L2 is connected to the center-tap of the second winding 320b; the sources of the rectifying switch Q5 and Q6 are connected to ground, the drains thereof are connected to two taps of the second winding 320c, and the filter L3 is connected to the center-tap of the second winding 320c; the sources of the rectifying switch Q7 and Q8 are connected to ground, the drains thereof is connected to two taps of the second winding 320d, and the filter L4 is connected to the center-tap of the second winding 320d. The gates SR1~SR8 of the rectifying switch Q1~Q8 and the first to fourth output switch SW1~SW4 are connected to the controller 420. The controller 420 sends signals the rectifying switch Q1~Q8 to drive one of the first to the fourth synchronous rectifying units 410a~410d to perform synchronous rectifying procedure. The controller 420 further sent signals to the first to fourth output switch SW1~SW4 to makes one of the first to fourth output switch SW1~SW4 to turn off or on, wherein when the first to fourth output switch SW1~SW4 is turned on, the rectified power con be conducted to the electronic device. The center tap of the transformer 30 is further electrically connected to an output capacitor Co.

The function and relative description of other components of power conversion system of this embodiment are the same as that of first embodiment mentioned above and are not repeated here for brevity, and the power conversion of this embodiment can achieve the functions as the power conversion system of the first embodiment does.

Although the present disclosure has been described with reference to the foregoing preferred embodiment, it will be understood that the invention is not limited to the details thereof. Various equivalent variations and modifications can still occur to those skilled in this art in view of the teachings of the present disclosure. Thus, all such variations and equivalent modifications are also embraced within the scope of the invention as defined in the appended claims.

What is claimed is:

1. A power conversion system comprising:
an isolating transformer (30) comprising a primary winding (310) and a plurality of secondary windings (320a~320d) coupled with the primary winding (310), wherein the isolating transformer (30) has a plurality of coupling distances between the secondary windings (320a~320d) and the primary winding (310);
an output-controlling device (40) comprising a plurality of output-controlling modules (400a~400d), wherein each of the secondary windings (320a'~320d) is electrically connected to one of the output-controlling modules (400a~400d);
a current sense unit (50) configured to sense a current required for an electronic device and generate a current sensed signal; and
a controller (420) electrically connected to the output-controlling modules (400a~400d) and the current sense unit (50);
wherein the controller (420) is configured to control an amount of the output-controlling module (400a~400d) placed in a conducting state in accordance with the current sense signal, thus an amount of the second winding (320a~320d) magnetically coupled with the primary winding (310) is modulated for varying a leakage inductance of the power conversion system and providing an output current met the current requirement of the electronic device.

2. The power conversion system of claim 1, wherein there is no output current provided by the output-controlling module (400a~400d) which is not placed in the conducting state.

3. The power conversion system of claim 1, wherein each of the output-controlling modules (400a~400d) comprises a synchronous rectifying unit (410a~410d), the controller (420) is electrically connected to the synchronous rectifying units (410a~410d), each of the secondary windings (321a~320d) is electrically connected to at least one of the synchronous rectifying unit (410a~410d), and the controller (420) places at least one synchronous rectifying unit (410a~410) in the conducting state for performing a synchronous rectifying procedure and providing the output current.

4. The power conversion system of claim 1, wherein each output-controlling module (400) comprises a synchronous rectifying unit (410a~410d) and an output switch (SW1~SW4), each output switch (SW1~SW4) is electrically connected to one of the synchronous rectifying units (410a~410d), the controller (420) places at least one switch (SW1~SW4) in the conducting state for providing the output current.

5. The power conversion system of claim 1, wherein the isolating transformer (30) further comprises:
a bobbin (330), the secondary winding (320a~320d) are assembled with the bobbin (330), the primary winding (310) is wound on the bobbin (330), wherein the primary winding (310) is wound at one side of each secondary winding (320*a*~320*d*), such that the primary winding (310) and the secondary winding (320*a*~320*d*) are in a staggered manner; and a magnetic core (340) assembled with the bobbin (330).

6. The power conversion system of claim 1, wherein the power conversion system has a lowest leakage inductance when all of the output-controlling modules (400*a*~400*d*) are placed in the conducting state.

7. The power conversion system of claim 1, wherein the secondary windings (320*a*~320*d*) are arranged at both sides of the primary winding (310), the controller (420) interleaved places the synchronous rectifying units (410*a*~410*d*) electrically connected to the secondary winding (320~320*d*) with the same coupling distance in the conducting state for performing the synchronous rectifying procedure and providing the output current.

8. The power conversion system of claim 7, wherein the controller (420) places the synchronous rectifying units (410*a*~410*d*) in the conducting state for performing the synchronous rectifying procedure in sequence, the sequence of the synchronous rectifying units (410*a*~410*d*) in the conducting state for performing synchronous rectifying procedure depends on distances between a central axis of the bobbin (330) and each of the synchronous rectifying units (410*a*~410*d*), and the controller (420) interleaved places the synchronous rectifying units (410*a*~410*d*) in the conducting state by gradually converges the distance between the central axis and the synchronous rectifying units (410*a*~410*d*) in the conducting state.

9. The power conversion system of claim 1, wherein the controller (420) places the synchronous rectifying units (410*a*~410*d*) in the conducting state for performing the synchronous rectifying procedure according to the current required for the electronic device sensed by the current sense unit (50).

10. The power conversion system of claim 1, wherein the output current provided by the power conversion system decreases when the leakage inductance of the power conversion system is increased.

11. The power conversion system of claim 1, wherein the controller interleaved places the synchronous rectifying units (410*a*~410*d*) with similar leakage inductance in the conducting state for performing the synchronous rectifying procedure and providing the output current.

12. A method for powering an electronic device comprising:

providing the power conversion system comprising a primary winding (310) and a plurality of secondary windings (320*a*~320*d*), wherein there are a plurality of coupling distances between the primary winding and the secondary windings;

sensing a current required for the electronic device;

modulating an amount of the secondary windings (320*a*~320*d*) coupled with the primary winding (310) for varying a leakage inductance of the power conversion system, thus an output current provided by the power conversion system is modulated to meet the current requirement of the electronic device.

13. The method of the claim 12, further comprising:

modulating an amount of the power-controlling modules (400*a*~400*d*) placed in the conducting state for varying the leakage inductance of the power conversion system.

14. The method of claim 12, wherein the power conversion system has a lowest leakage inductance when all of the output-controlling modules (400*a*~400*d*) are placed in the conducting state, thus a largest output current is provided.

15. The method of claim 12, wherein the output current is provided by the power controlling module placed in the conducting state.

\* \* \* \* \*